April 18, 1967  R. N. QUENNEVILLE  3,314,310
PLANET GEAR CONSTRUCTION

Filed Oct. 8, 1964  2 Sheets-Sheet 1

INVENTOR
RAYMOND N. QUENNEVILLE
BY Norman Friedland
ATTORNEY

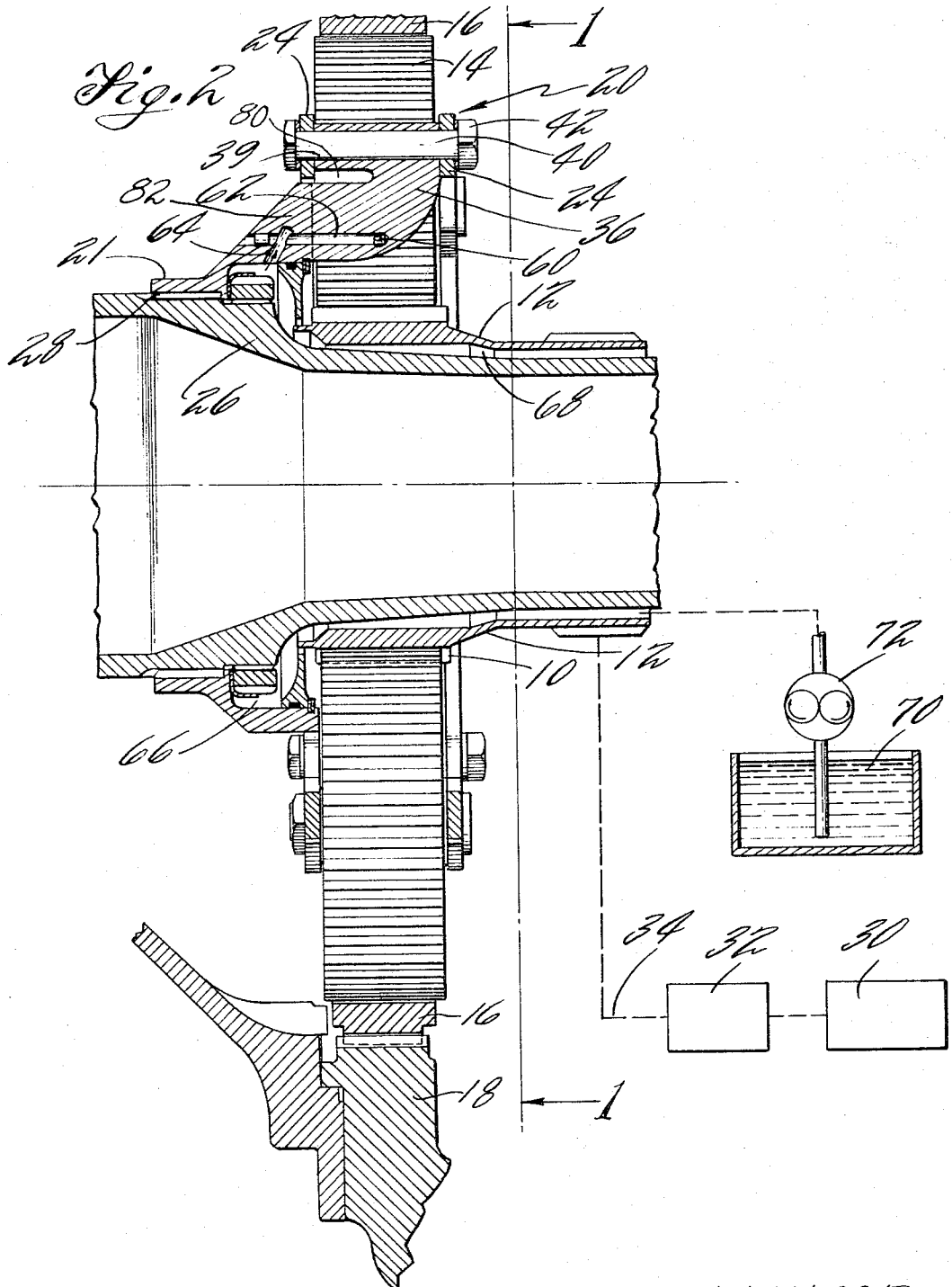

United States Patent Office 3,314,310
Patented Apr. 18, 1967

3,314,310
PLANET GEAR CONSTRUCTION
Raymond N. Quenneville, Granby, Conn., assignor to United Aircraft Corporation, East Hartford, Conn., a corporation of Delaware
Filed Oct. 8, 1964, Ser. No. 402,439
12 Claims. (Cl. 74—801)

This invention relates to improvement in gearing and particularly to the construction of planetary gearing.

An object of the invention resides in the provision of an improved cage for planetary gears serving to keep and maintain the gear elements in alignment with each other.

Another feature of this invention resides in the provision of an improved lubrication system for directing lubricant with the use of the gear teeth in opposition to centrifugal force.

As is generally well known the planetary gear train is normally supported by a rigid structure used to transmit the torque of the gearing system to the output shaft and maintain the alignment of the gears relative to their centers. It is also customary to provide various members of the gearing system to float to provide for a more equal load distribution amongst the planetary elements.

I have found that I can eliminate the need for the rigid structure supporting the planet gears by utilizing a novel flexible cage construction. To this end I am able to substantially reduce the size and weight of the entire gearing system. Such a reduction in weight and size is of paramount importance in aircraft application inasmuch as additional weight is viewed as a penalty in the efficiency of the overall system. Such a flexible cage is designed to control rather than limit the system deflections which is normally the reverse of the heretofore known types of planetary gearing systems. Since relatively large deflections are provided, the cage may then be designed to be stress limited rather than deflection limited, hence, resulting in a lighter structure. Inasmuch as the relatively high deflection of the cage provides essentially a low spring rate between the planet gears and the output shaft, the individual planet gears can then pick up their load gradually and equally despite slight variations in the gear centers which variations may result due to manufacturing tolerances. By virtue of this novel flexible cage construction, the following advantages are afforded:

(1) A more equal load distribution than heretofore realized is obtained.

(2) The weight of the planetary gearing and its attendant mechanism is substantially reduced.

(3) Self-alignment is obtained as a result of the low spring rate evidenced about the axis that normally produces skewing in the heretofore planet gearing constructions.

Other features and advantages will be apparent from the specification and claims and from the accompanying drawings, in which like reference numerals are used to designate similar parts throughout and which illustrate an embodiment of the invention.

FIG. 2 is a sectional view taken along line 2—2 of FIG. 1.

Figure 1:
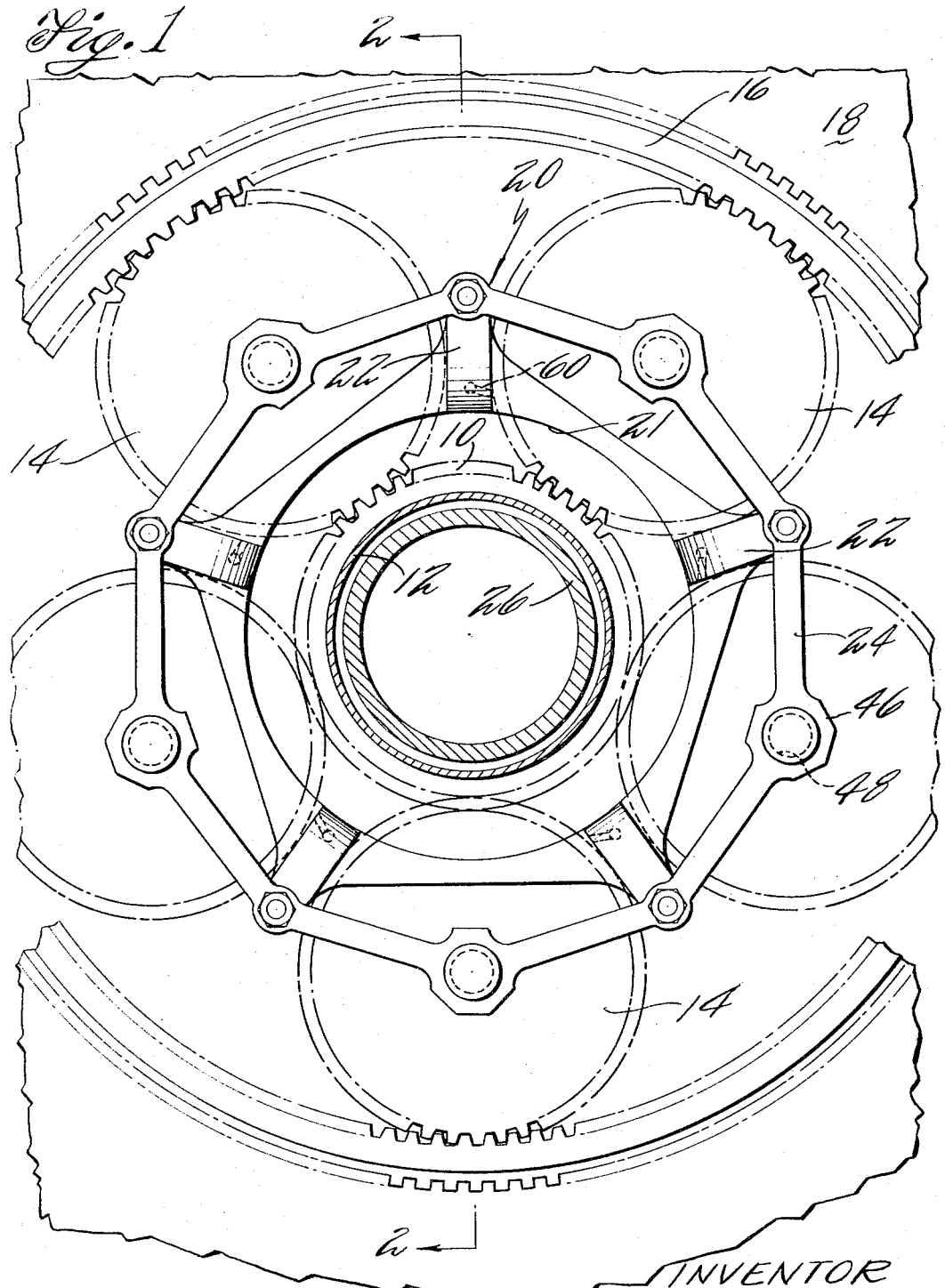
FIG. 1 is an elevated view partly in section taken along line 1—1 of FIG. 2.

Referring to the drawings in detail, there is illustrated in FIG. 1, by way of example, a suitable planetary gear train in which the device of the invention may be advantageously incorporated. In the gear train illustrated, sun gear 10 is secured to drive shaft 12 and meshes with and drives a plurality of planetary gears illustrated by numeral 10. Each of the planetary gears 14, in turn, mesh with the internal teeth of ring gear 16 which is suitably splined and rigidly supported to housing 18. The planetary gears are supported by a planetary cage generally indicated by the numeral 20. Planetary cage 20 comprises an annular body section 21 surrounding the axis of rotation and carries a plurality of outwardly extending spokes 22. Suitably secured to opposing sides at the top of these spokes are straps 24 which serve to support planetary gears 14 and transmit torque from the sun gear to the annular portion 21 of cage 20 which, in turn, is suitably splined to driven shaft 26.

The spline on the annular body 21 of cage 20 can best be seen by referring to FIG. 2. As noted, spline 28 on the inner diameter of annular portion 21 of the cage 20 engages a suitable spline rigidly secured and drivingly connected to shaft 26 for rotating thereof. Obviously, in a propeller application the planetary gear serves to drive the propeller at a reduced speed of the input drive shaft driven by the power plant 30 through clutch 32 as schematically illustrated.

In accordance with this invention cage 20 carries a plurality of spokes 22 having at its outward projecting section a U-shaped body portion 36, the U-shape being apparent when spoke 22 is viewed in a section view as taken along line 2—2 of FIG. 1. Thus, the U-shape appears in FIG. 2, coplanar with the paper. A bore 39 in line with the axis of rotation is formed in the upper leg 40 of spoke 36 for receiving bolt 42 which serves to support straps 24 disposed on either end thereof. A suitable nut engaging bolt 42 holds the straps in spaced parallel alignment relative to each other. As mentioned above, boss 46 formed midway between adjacent spokes carries and supports in a bore 48 formed therein the planet gears 14. In operation, the loads are transmitted from the planet gear 14 through the opposing straps 24 to the spokes 22. This, in turn, rotates the entire cage which is, in turn, splined to the shaft for rotating the same. The loads being transmitted to the spokes tend to concentrate itself somewhere intermediate the outer ends thereof. Normally this has a tendency of skewing the entire cage about the vertical axis viewed with respect to the rotating center line. However, due to the particular shape of spoke 22 the spoke tends to deflect evenly with respect to the plane of the paper so that the teeth of the gears in seeing this deflection tend to stay in alignment with respect to their longitudinal axes. By virtue of the relatively high deflections and the longitudinal stretching of the straps, the low rate spring between the planet gears and the output shaft is inherent in this cage construction allowing the individual planet gears to pick up their load gradually and equally despite slight variations in the gear centers due to machining tolerances.

In choosing the proper configuration of the spoke, I have found that this best can be done by forming the spoke in the general U-shaped configurations, as shown coplanar with the paper of FIGURE 2, leaving excessive material at the opening 80 between the upper leg 40 and the lower leg 82 of the U-shape. Then the spoke is rigidly supported and a force is applied to it so as to cause it to deflect. Material between the legs is then removed until the upper leg moves uniformly relative to the plane of the paper. It is noted that there is a slight rotational movement about an arbitrary vertical axis taken along a line intermediate the ends of the spoke tending to place the longitudinal axes of bore 39 in angular relationship to the rotating center line. This deflection, however, does not adversely affect the operation of the gears but rather has a tendency of keeping the load distribution along the teeth of the gears uniform.

Obviously, the centrifugal field adjacent the rotating shaft presents the problem of lubricating the sun gear mounted in the vicinity of this field. The problem is solved by directing a stream of lubricating oil through apertures 60 formed on the side of spokes 22 and orienting the stream so that it impinges on the rotating teeth of the planetary gears 14 and is directed downwardly toward the sun gear. The impinging force is sufficient to overcome the centrifugal force, hence, eliminating the need for creating a large pressure head for the lubricating system. Oil is directed to aperture 60 through drilled passages 62, 64, annulus 66 and through the space 68 formed between input shaft and output shaft 26. As schematically illustrated, oil is supplied to the planetary gear through a suitable supply system which may include an oil reservoir 70 and pump 72.

It should be understood that the invention is not limited to the particular embodiments shown and described herein, but that various changes and modifications may be made without departing from the spirit or scope of this novel concept as defined by the following claims.

I claim:

1. Gear alignment means for a planetary gear system comprising a planetary cage adapted to rotatably support a plurality of planet gears, said planetary cage having an annular body portion, a plurality of spokes extending outwardly from said annular portion, said spokes including a U-shaped member having one leg attached to the body portion, and having the other leg supporting the associated planet gear, said U-shaped member being deflectable in the plane of rotation of the planet gears.

2. Gear alignment means as claimed in claim 1 including strap means and in which said planet gears are located adjacent said U-shaped members and in which the planet gears are supported by strap means extending between adjacent U-shaped members.

3. Gear alignment means as claimed in claim 2 wherein said strap means are supported at opposite ends of said other leg of the U and located at opposite sides of the planet gear.

4. Gear alignment means for a planetary gear system comprising a planetary cage adapted to rotatably support a plurality of planet gears, said planetary cage having an annular body portion, a plurality of spokes extending outwardly from said annular portion, said spokes including a U-shaped member having one leg integrally connected to the body portion, and having the other leg supporting the associated planet gear and extending parallel to the planet gear axis, said U-shaped member being deflectable in the plane of rotation of the planet gears.

5. Gear alignment means as claimed in claim 4 wherein said strap means includes a pair of parallelly spaced annular shaped members supported on either end of said other leg of said spoke.

6. Gear alignment means for a planetary gear system comprising a planetary cage adapted to rotatably support a plurality of planet gears, said planetary cage having an annular body portion, a plurality of equally spaced spokes extending outwardly from the outer periphery of said annular portion, said spokes including a U-shaped member having one leg attached to the body portion, and having the other leg supporting the associated planet gear, said U-shaped member being deflectible in the plane of rotation of the planet gears.

7. Gear alignment means as claimed in claim 6 including rotatably mounted annular shaped strap means carrying a plurality of bearings spaced equidistant about the axis of rotation and midway between adjacent spokes supporting said planetary gears, and means for attaching said strap means to at least one end of said other leg of said spoke.

8. A planetary gear train having a sun gear, a driving shaft driving said sun gear, a ring gear concentrically disposed relative to said sun gear and a plurality of spaced planet gears mating with and disposed between said ring gear and said sun gear, and having their center lines parallel to the center line of said driving shaft, the improvement comprising a cage rotatably supporting said planet gears and drivingly connected to a driven shaft, a pair of straps, said cage including an annular body portion and a plurality of U-shaped spokes having one leg of the U connected to the annular body and opposing ends of said other leg of said U supporting said straps in parallel spaced relationship, said U-shaped spoke being deflectable in the plane of rotation of the planet gears, and bearing means supported by said straps equidistant from adjacent spokes rotatably supporting said planet gears.

9. A lubricating system for a planetary gear train which train includes a sun gear concentrically secured to a rotating member and rotating therewith, a plurality of planet gears concentrically disposed about said sun gear and driven thereby, a cage rotatably supporting said plurality of planet gears, said cage including outwardly extending spokes between adjacent planetary gears, a driven shaft coaxially mounted relative to said rotating member driven by said cage, said rotating member and driven shaft defining a space therebetween, passage means in said spokes communicating with said space for directing lubricant to the adjacent planetary gear so that the lubricant discharging stream impinges on the teeth of said adjacent planetary gear whereby said lubricant is directed to said sun gear and means for feeding lubricant to said space.

10. A lubricating system as defined in claim 9 wherein said space is annularly shaped.

11. A lubricating system as defined in claim 9 wherein said last mentioned means includes a lubricant reservoir and pump means interconnecting said reservoir and said space.

12. Gear alignment means as claimed in claim 2 wherein said strap means are longitudinally extensible so that the load is applied to the planet gears in such a manner as to be absorbed gradually and equally by the planet gears.

References Cited by the Examiner

UNITED STATES PATENTS

| 2,127,463 | 8/1938 | Chilton | 74—801 |
| 2,591,743 | 8/1952 | Thompson | 74—801 |
| 2,893,268 | 7/1959 | Liebel | 74—801 |
| 3,227,006 | 1/1966 | Bowen | 74—801 |

FOREIGN PATENTS

| 274,396 | 7/1927 | Great Britain. |
| 411,965 | 6/1934 | Great Britain. |
| 614,960 | 12/1948 | Great Britain. |
| 798,273 | 10/1956 | Great Britain. |

DAVID J. WILLIAMOWSKY, *Primary Examiner.*

J. R. BENEFIEL, *Assistant Examiner.*